(12) United States Patent
Suldhal

(10) Patent No.: US 9,875,043 B1
(45) Date of Patent: Jan. 23, 2018

(54) MANAGING DATA MIGRATION IN STORAGE SYSTEMS

(71) Applicant: EMC Corporation, Hopkinton, MA (US)

(72) Inventor: Dayanand Suldhal, New Canaan, CT (US)

(73) Assignee: EMC IP Holding Company, LLC., Hopkinton, MA (US)

( * ) Notice: Subject to any disclaimer, the term of this patent is extended or adjusted under 35 U.S.C. 154(b) by 61 days.

(21) Appl. No.: 14/674,647

(22) Filed: Mar. 31, 2015

(51) Int. Cl.
*G06F 12/00* (2006.01)
*G06F 3/06* (2006.01)

(52) U.S. Cl.
CPC .......... *G06F 3/0619* (2013.01); *G06F 3/0647* (2013.01); *G06F 3/0665* (2013.01); *G06F 3/0685* (2013.01); *G06F 3/0689* (2013.01)

(58) Field of Classification Search
CPC .... G06F 3/0619; G06F 3/0647; G06F 3/0665; G06F 3/085; G06F 12/02; G06F 12/023; G06F 3/0689; G06F 2212/70
See application file for complete search history.

(56) References Cited

U.S. PATENT DOCUMENTS

| | | | | |
|---|---|---|---|---|
| 7,463,648 B1 * | 12/2008 | Eppstein | ............... | G06F 9/5011 370/468 |
| 7,480,912 B2 * | 1/2009 | Arnold | ................. | G06F 9/5016 711/111 |
| 7,484,059 B1 * | 1/2009 | Ofer | ...................... | G06F 3/0607 711/162 |
| 7,631,155 B1 * | 12/2009 | Bono | .................... | G06F 3/0608 707/999.202 |
| 7,685,129 B1 * | 3/2010 | LeCrone | ............... | G06F 3/0617 707/999.01 |
| 8,006,061 B1 * | 8/2011 | Chatterjee | ............. | G06F 3/0605 711/170 |
| 8,285,758 B1 * | 10/2012 | Bono | ................ | G06F 17/30079 707/822 |
| 8,473,678 B1 * | 6/2013 | Rajasekaran | ......... | G06F 3/0605 711/114 |
| 8,645,654 B1 * | 2/2014 | Bailey | ................... | G06F 3/0605 711/165 |
| 8,990,527 B1 * | 3/2015 | Linstead | ............... | G06F 3/0617 711/161 |
| 9,395,937 B1 * | 7/2016 | Si | ........................... | G06F 3/0689 |
| 9,460,102 B1 * | 10/2016 | Bono | ................ | G06F 17/30156 |
| 9,542,125 B1 * | 1/2017 | Chen | ..................... | G06F 3/0679 |
| 2006/0112247 A1 * | 5/2006 | Ramany | ................ | G06F 3/0605 711/165 |
| 2009/0276588 A1 * | 11/2009 | Murase | ................. | G06F 3/0608 711/160 |

(Continued)

*Primary Examiner* — David X Yi
*Assistant Examiner* — Francisco Grullon
(74) *Attorney, Agent, or Firm* — Krishnendu Gupta; Deepika Bhayana; Lesley A. Leonessa

(57) ABSTRACT

A method is used in managing data migration in storage systems. A request to migrate data of a logical object from a source storage pool to a destination storage pool is received. The data of the logical object is mapped to a mapped logical object created in the destination storage pool. The data of the logical object is relocated to storage space allocated in the destination storage pool. Mappings of the mapped logical object are updated to refer to the data relocated to the storage space allocated in the destination storage pool.

16 Claims, 13 Drawing Sheets

(56) References Cited

U.S. PATENT DOCUMENTS

| | | | | |
|---|---|---|---|---|
| 2010/0070978 A1* | 3/2010 | Chawla | ............... | G06F 9/5077 |
| | | | | 718/105 |
| 2011/0010514 A1* | 1/2011 | Benhase | ............... | G06F 3/061 |
| | | | | 711/162 |
| 2013/0166872 A1* | 6/2013 | Arakawa | ............... | G06F 3/0607 |
| | | | | 711/170 |
| 2015/0355862 A1* | 12/2015 | Hayes | ............... | G06F 3/0619 |
| | | | | 711/114 |

* cited by examiner

MANAGING DATA MIGRATION IN STORAGE SYSTEMS

BACKGROUND

Technical Field

This application relates to managing data migration in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different RAID levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact.

RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like. However, a problem of underuse typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a mapped LUN (e.g., thin logical unit (TLU), direct logical unit (DLU)), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

Generally, data storage systems typically arrange the data and metadata of file systems in blocks of storage. For example, the file data constituting files in a file system are stored in blocks of storage, as are inodes, indirect blocks, and other metadata. Data storage systems may provision storage to file systems in units of fixed size, here called "slices." Data storage systems may generate slices, for example, from one or more physical storage devices, such as RAID groups of physical storage devices.

Some data storage systems provide thinly provisioned file systems that are organized based on sparsely populated logical unit such as mapped LUNs. Thinly provisioned file systems typically have very large address spaces but allocate specific storage slices to populate file systems only as storage is needed to satisfy write requests. A thinly provisioned file system may thus have an address space that is measured in petabytes but may allocate slices to occupy only a small fraction of the address space.

SUMMARY OF THE INVENTION

A method is used in managing data migration in storage systems. A request to migrate data of a logical object from a source storage pool to a destination storage pool is received. The data of the logical object is mapped to a mapped logical object created in the destination storage pool. The data of the logical object is relocated to storage space allocated in the destination storage pool. Mappings of the mapped logical object are updated to refer to the data relocated to the storage space allocated in the destination storage pool.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
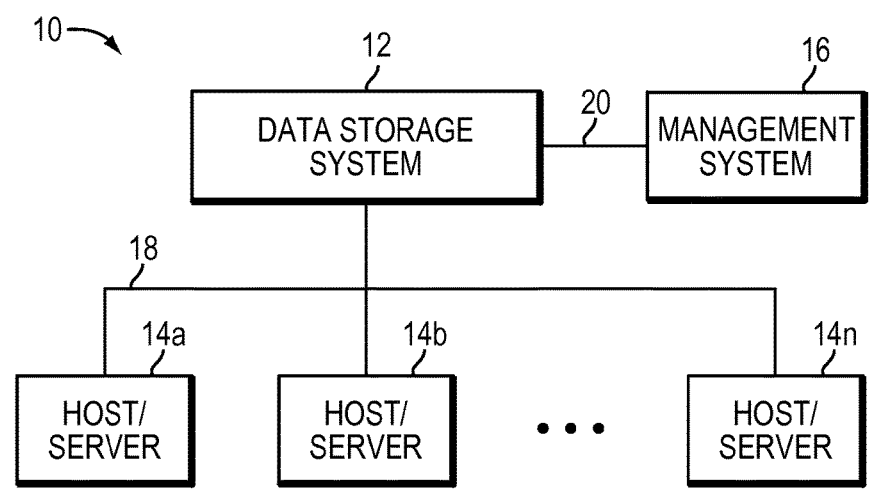
FIGS. 1-2 are examples of an embodiment of a computer system that may utilize the techniques described herein.

Described below is a technique for use in managing data migration in storage systems, which technique may be used to provide, among other things, receiving a request to migrate data of a logical object from a source storage pool to a destination storage pool, mapping the data of the logical object to a mapped logical object created in the destination storage pool, and relocating the data of the logical object to storage space allocated in the destination storage pool, where mappings of the mapped logical object is updated to refer to the data relocated to the storage space allocated in the destination storage pool.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 256 megabytes (MB) in size. A pool may include a set of storage tiers. Further, both a storage tier and a pool may have storage devices of different performance capabilities and costs. A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Data migration, i.e., the moving of data from one storage object to another, may be performed at the LUN level or at the slice level. Data migration at the slice level may be performed by copying the data of a slice and then updating an address map of the slice with the new location of the slice. A slice may store data or metadata of the data. I/O operations performed for copying data of a slice in order to relocate the slice are referred to as relocation I/Os. Generally, in order to perform data migration for a storage object such as a slice on which an I/O request from a host system is directed to at the time the slice is being relocated, the slice is mirrored in such a way that two copies of the slices are maintained during relocation of the slice where a source copy refers to the original slice which is targeted for migration and a destination copy refers to a destination slice to which data of the original slice is copied to. Thus, data associated with a write I/O request directed to a portion of a slice which is in a process of being relocated is written to the slice and a destination slice which is mirrored to the slice. It should be noted that "migration" and "relocation" are used interchangeably herein.

Further, a tiered storage pool may include storage with different performance characteristics such that a logical unit created from storage space provisioned from the storage pool may include slices from different storage tiers with different performance characteristics.

Based on configuration of a storage pool and the type of a logical unit of the storage pool, slices may be provisioned for the logical unit either dynamically at the time the logical unit requires slices for allocating storage space or at the time the logical unit is created. Allocating a slice to a logical unit is referred to as provisioning the slice to the logical unit. Thus, a provisioned slice allocated to a logical unit has an owner which may be a file system represented by the logical unit. When a provisioned slice is written to by a host system and includes user data, the provisioned slice is referred to as an allocated provisioned slice. When a provisioned slice has not been written to by a host system and does not include any user data, the provisioned slice is referred to as an unused provisioned slice. A slice residing in a storage pool which is available for provisioning to a logical unit is referred to as an un-provisioned slice.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to herein as "direct mapped LUN" or "thick LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

File system mapping logic in a storage system provides a thin provisioning service by adding fixed sized slices to a file system when the file system needs storage space to write data. In such a case, when a file system requires a slice, the file system sends a request to provision the slice to a slice manager component of a storage system. A slice request framework manages requests to provision slices.

Generally, a slice request framework in a data storage system manages provisioning of slices to a mapped LUN associated with a file system such that the slice request framework adds a slice to the file system or a volume of the file system when the slice request framework receives a request to provision the slice. A file system may need to provision a slice when the file system requires storage space for writing data. Further, a file system may also need to provision a slice when a migration process requires a slice to copy data from a source LUN.

Conventionally, migrating data of a logical object such as a LUN or a mapped LUN from a source storage pool to a destination storage pool requires a manual copy of entire data of the logical object from the source storage pool to the destination storage pool. Thus, in such a conventional system, each slice of a LUN is copied from a source storage pool to a new LUN allocated from a destination storage pool. Thus, in such a conventional system, migration of data of a LUN from a source storage pool to a destination storage pool is not completed until each data block of the LUN is migrated to the destination storage pool.

By contrast, in at least some implementations in accordance with the technique as described herein, the current technique enables migration of data of a source LUN from a source storage pool to a destination storage pool using mapping capabilities provided by a file system mapping logic in such a way that both source and destination LUNs may be made accessible to a host and/or user after mappings of the data of the source LUN are updated. Thus, in at least some implementations in accordance with the current technique, migration of data occurs in background and a host may start accessing a destination LUN as soon as mappings of the data are updated. Consequently, in at least some implementations in accordance with the current technique, a notification indicating completion of migration of data of a LUN may be sent to a host without having to copy the data from a source storage pool to a destination storage pool.

In at least some implementations in accordance with the current technique as described herein, the use of the managing data migration in storage systems technique can provide one or more of the following advantages: improving efficiency of a data storage system by efficiently managing migration of data, improving performance of a migration process by successfully sending a notification of completion of the migration of data without having to copy the data, and improving efficiency of a migration process by updating mapping of data such that a destination LUN maps to a source LUN before copying the data from a source storage pool to a destination storage pool.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
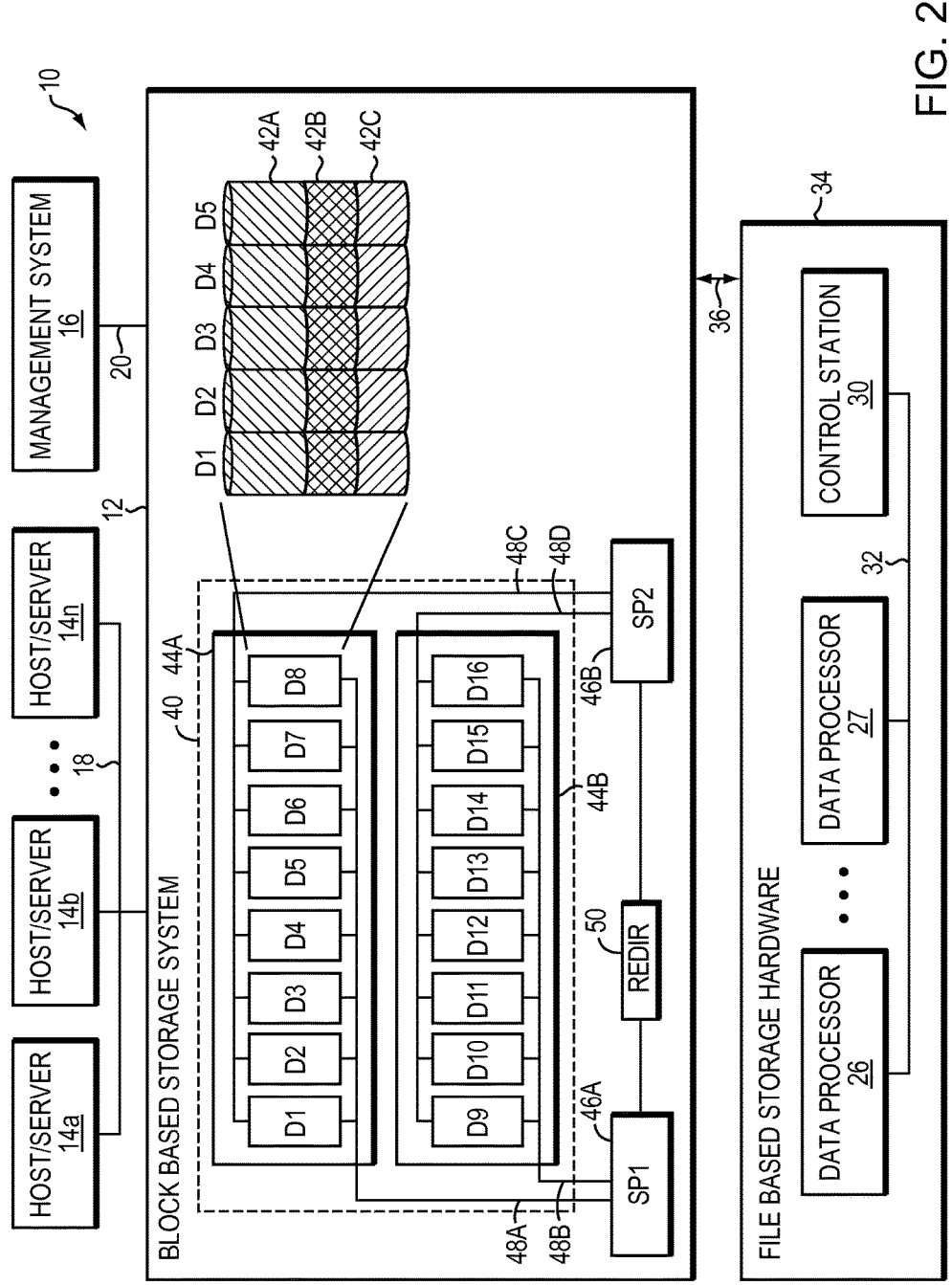

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 1, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
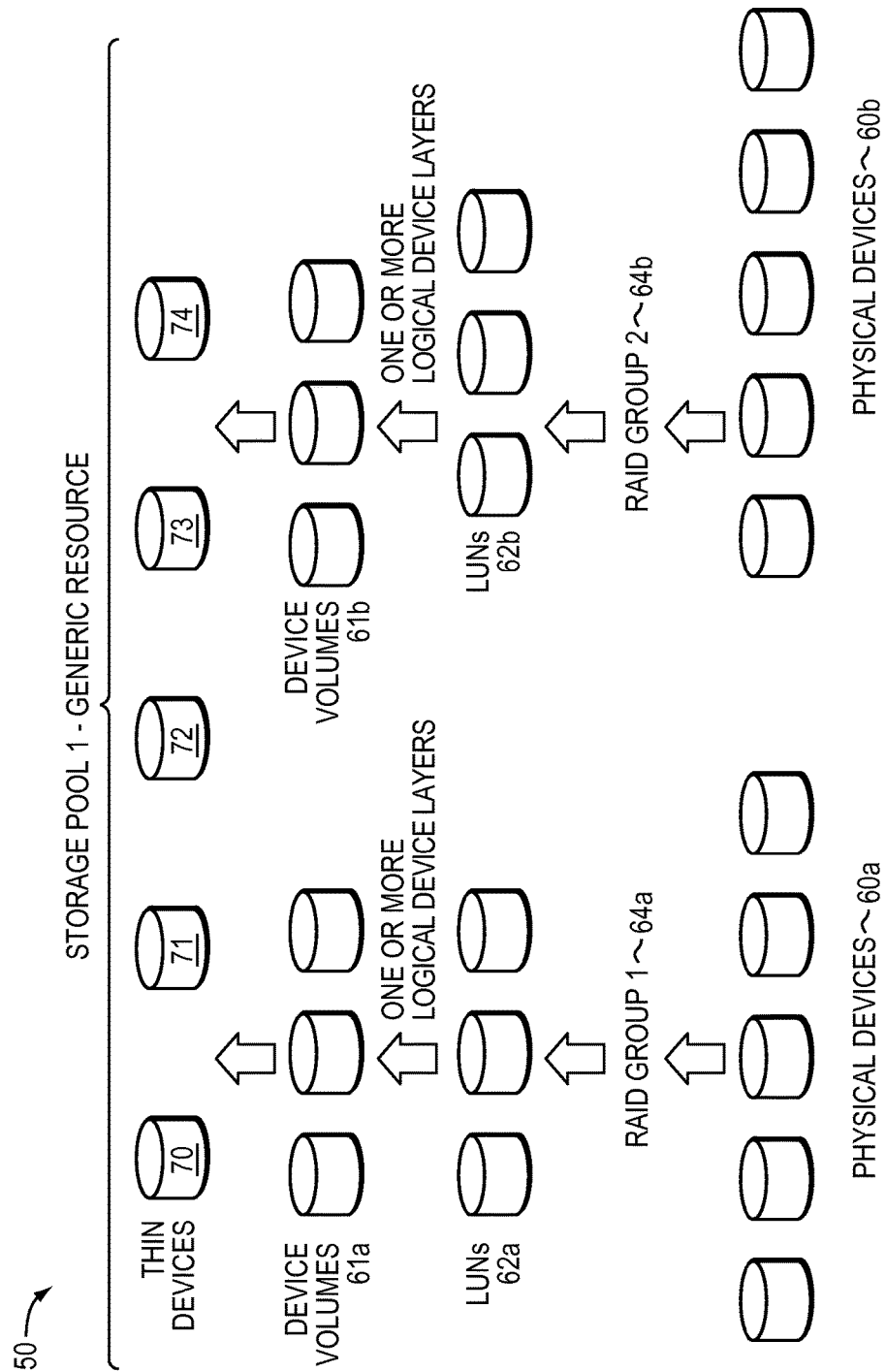
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Figure 4:
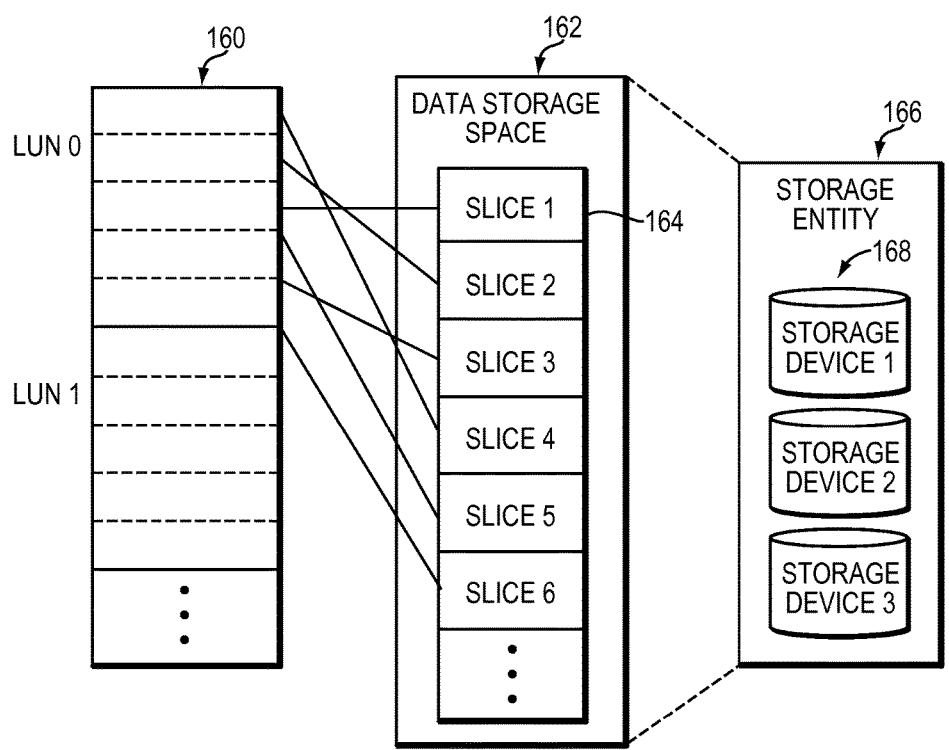
FIGS. 4-5 are block diagrams illustrating in more detail components that may be used in connection with techniques herein.

Referring to FIG. 4, shown is a diagram illustrating another example of logical division of a storage of a data storage system into storage objects (such as RAID groups, storage devices, slices) for managing data migration in storage systems that may be included in an embodiment using the techniques described herein. Data storage system 12 includes a storage entity 166 having data storage space for storing data. Storage entity 166 may include one or more storage devices 168, which may be hard disk drives, flash drives, or other devices capable of storing data. In at least one embodiment, a collection of hard disk drives may be organized into redundant array of inexpensive disks (RAID) arrays. The collective data storage capacity of storage devices 168 is represented by data storage space 162. Data storage space 162 may be divided into portions, hereinafter referred to as slices 164. In at least one embodiment of the current technique, for example, each slice 164 is approximately 1 gigabyte (GB) in size, but other sizes may be used. Slices 164 within data storage space 162 may be organized into logical units (LUs), which are commonly referred to as LUNs 160. In the example illustrated in FIG. 4, data storage space 162 includes two LUNs, LUN0 and LUN1. One or more slices 164 are allocated to each LUN 160. For example, slices 1, 2, and 4 have been allocated to LUN0; slices 3, 5, and 6 have been allocated to LUN1; and slice 7 is unallocated to any LUN. Additionally, each LUN 160 may include slices allocated from different types of storage devices 168. For example, slice 1 allocated to LUN0 at an offset may be allocated from a storage device that is included in a faster storage tier and slice 2 allocated to LUN0 at a different offset may be allocated from a different storage device that is included in a slower storage tier.

Figure 5:
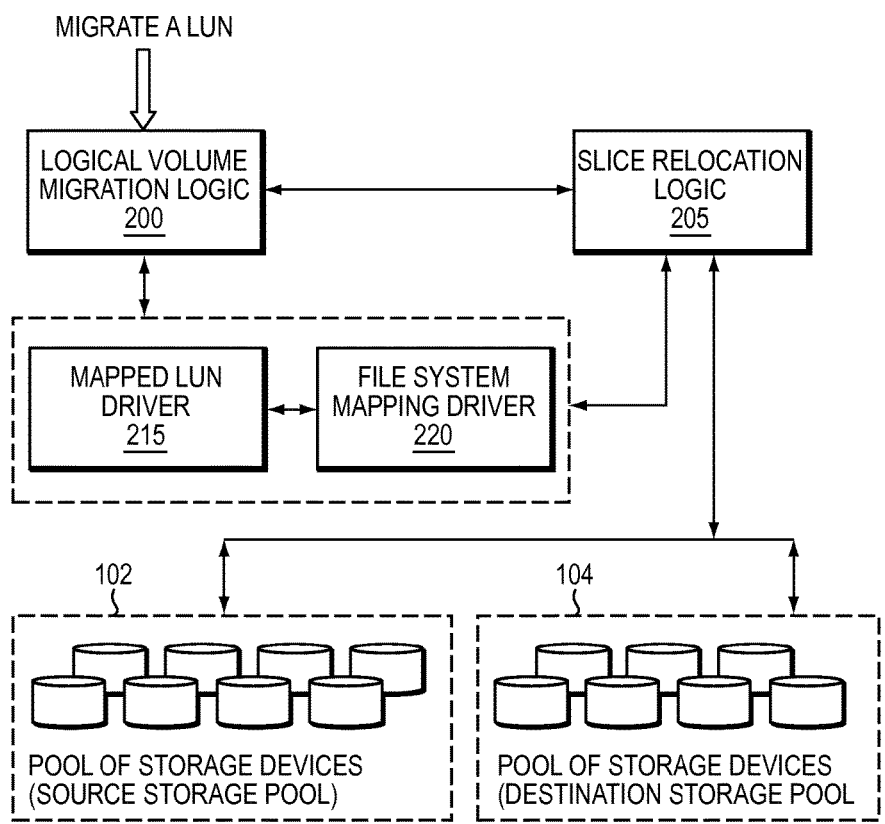

Referring to FIG. 5, shown is more detailed example of an embodiment of a computer system that may be used in connection with performing the techniques described herein. In at least some embodiments of the current technique, a storage pool 102, 104 may include one or more RAID groups. A RAID group may be associated with data devices, such as the physical devices 60a-60b discussed herein, so that, for example, there is one or more data devices for each RAID group, any portion of a data device for any portion of the pools of storage, and/or any combinations thereof. Further, data devices associated with a storage pool may have different characteristics, such as speed, cost, reliability, availability, security and/or other characteristics. Further, storage pool 102, 104 may include one or more storage tiers such that each storage tier has different performance characteristics.

In at least one embodiment of the current technique, slice relocation logic 205 (also referred to as "Auto-Tiering policy engine (PE)") may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as a flash storage drives. Slice relocation logic 205 relocates a slice based on the temperature of the slice. The temperature of a slice is determined based on I/O activity directed to the slice. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts.

In at least one embodiment of the current technique, slice relocation logic 205 works in conjunction with file system mapping driver 220 to relocate slices for migrating data of the slices. Further, file system mapping driver 220 works in conjunction with mapped LUN driver 215 to relocate slices selected for migrating data of logical objects identified for data migration by logical volume migration logic 200.

With reference also to FIGS. 1-4, in a data storage system such as data storage system 12, a set of Flare LUNs are built from a storage space provided by disk drives. A user of data storage system 12 allocates storage from Flare LUNs in fixed sized chunks. Each fixed size chunk is known as a slice. One or more slices are grouped together to create a slice pool. Host system 14 provisions storage from slice pools (e.g., 102, 104) for creating mapped LUNs. A mapped LUN is a LUN that is visible to host system 14 and a user of a data storage system. A mapped LUN may be a thin LUN (TLU) or a direct LUN (DLU). File system mapping driver 220 is a light-weight file system library that provides file system functionality and allows data storage system 12 to create files within a file system. File system mapping driver 220 processes I/Os directed to metadata of a file system. Mapped LUN driver 215 processes I/Os directed to data of the file system. Mapped LUN driver 215 also provides slices of storage from slice pools 102, 104 to file system mapping driver 220 for creating a file system. Slices of storage can be dynamically added or removed by a file system. When a slice is removed, the file system redistributes data stored on the slice to other slices in the file system. File system mapping driver 220 allocates file system blocks from slices of storage for creating files and storing metadata of a file system. In at least some embodiments of the current technique, size of the file system block may be 8 kilobyte (KB) in size. A sparse volume concatenates slices of storage provided to file system mapping driver 220 into a logical contiguous address space on which a file system is created. The sparse volume maintains logical to physical mapping for slices of storage used to create the file system. Further, the file system maintains an allocation bitmap for every slice of physical storage that is used to create the file system. A mapped LUN presents a file as a LUN to host system 14. Further, the file presents a contiguous logical address space to the mapped LUN.

Referring to FIGS. 6A-6G, shown are more detailed examples of an embodiment of a computer system that may be used in connection with performing the techniques described herein. With reference also to FIGS. 1-5, in at least one embodiment of the current technique, when data of a source LUN is migrated to a destination LUN, both source and destination LUNs may be made accessible to a host as soon as mapping of the data are updated by file system mapping driver 220 in such a way that the data of the source LUN is migrated to the destination LUN by a background process. Further, the background process may adaptively change the number of slices that are being copied concurrently from a source LUN to a destination LUN.

FIGS. 6A-6G illustrates an example migration of a source logical LUN 252 (e.g., a mapped LUN) from a source storage pool to a destination storage pool in accordance with the current technique. For example, in FIG. 6A, the source logical LUN 252 resides in a source storage pool including FLASH and SATA drives. Further, the destination storage pool includes SAS and NL-SAS drives. The storage devices 254, 256 illustrated in FIG. 6A-6G indicates a LUN created from RAID groups that provide storage to a thinly provisioned LUN created in source and destination storage pools based on a predefined chunk size (e.g., 1 Gigabyte (GB), 256 Megabytes (MB)).

Figure 6A:
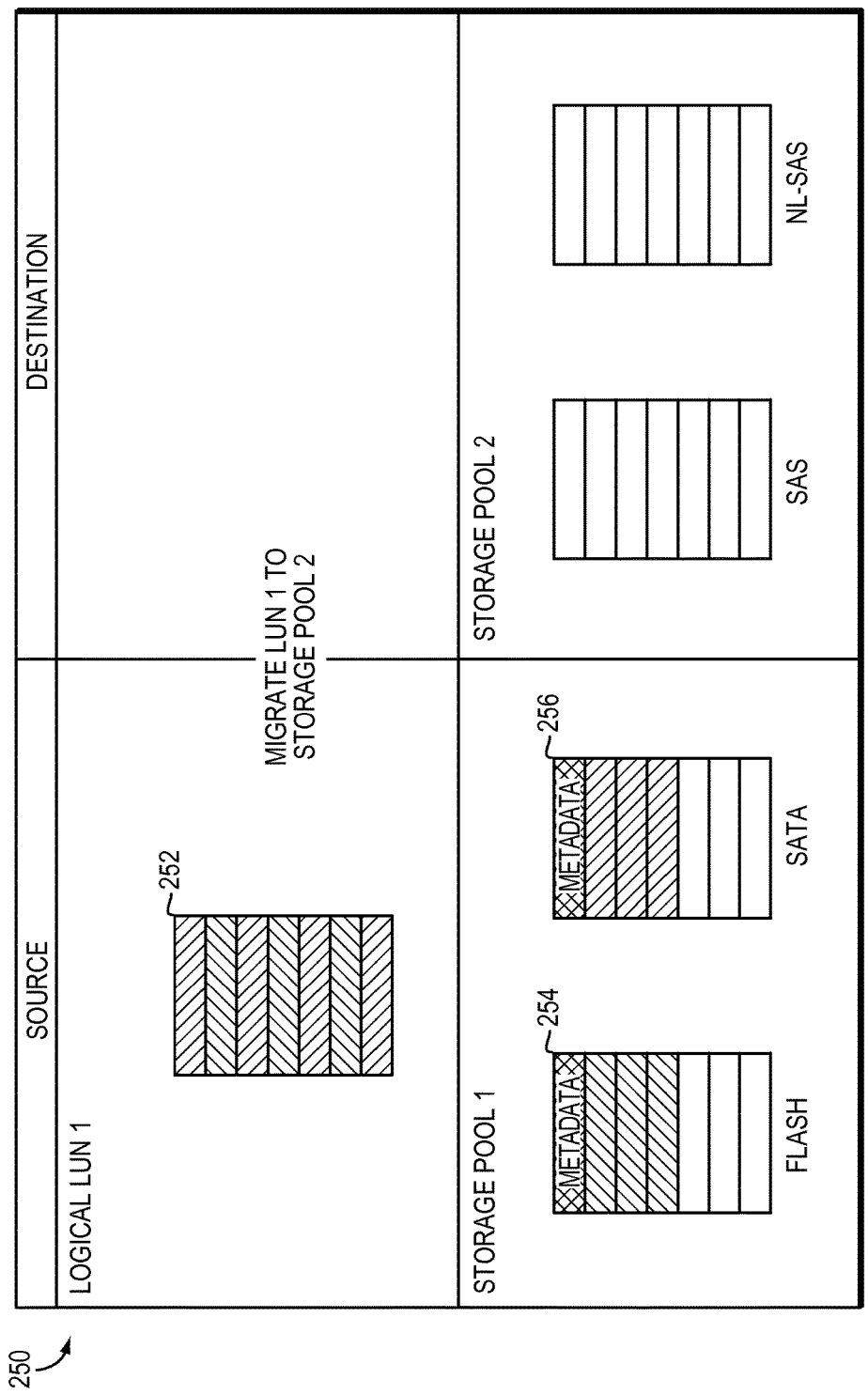
FIGS. 6A-6G are simplified block diagrams of an exemplary system for managing migration of logical objects in a data storage system according to an embodiment of the techniques described herein.
Figure 6B:
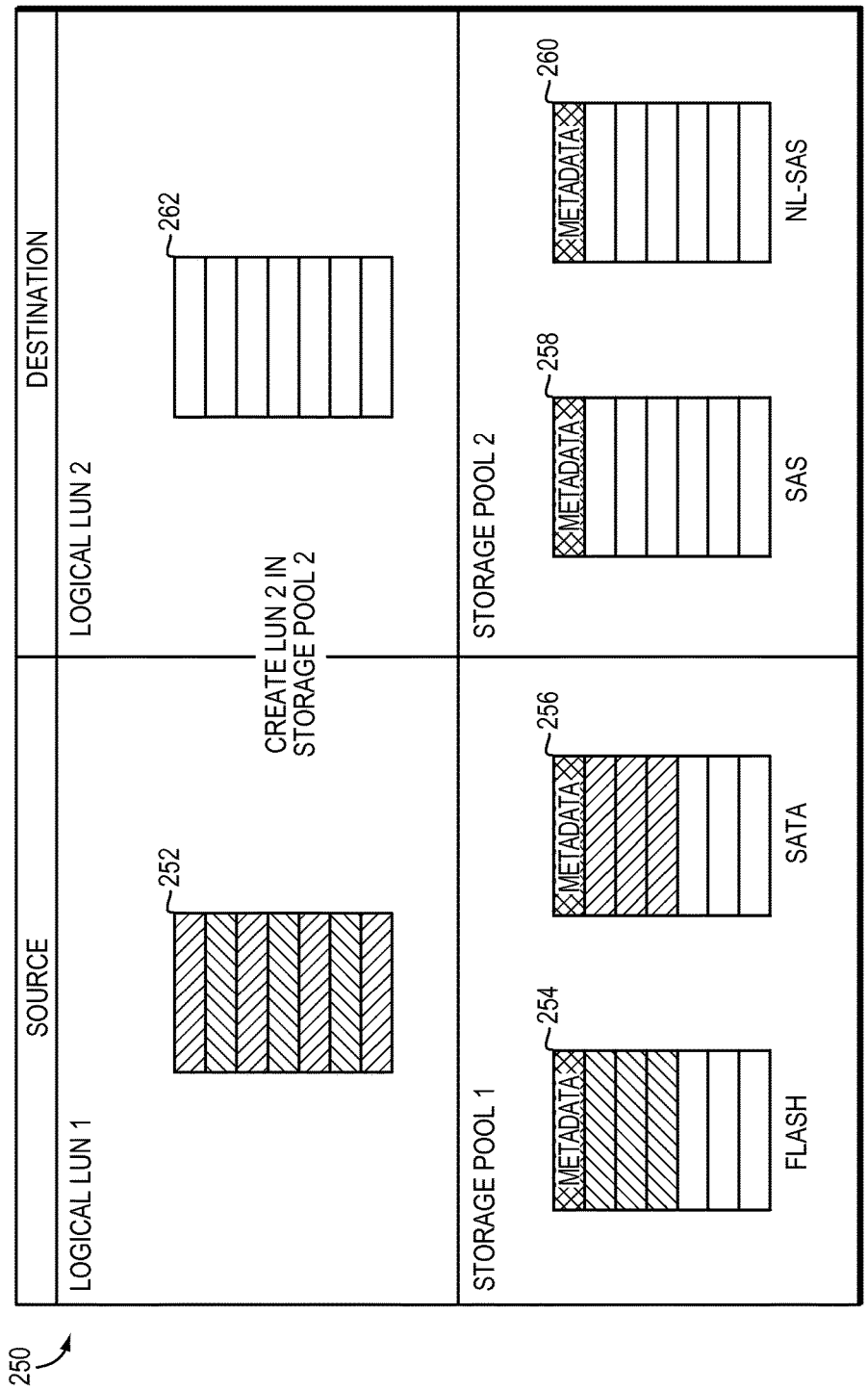

FIG. 6B illustrates start of an example data migration process in accordance with the current technique. In at least one embodiment of the current technique, when a request to migrate source logical LUN 252 is received, a mapped LUN (e.g., a thinly provisioned LUN) 262 of same or similar size as the source LUN 252 is created in a destination storage pool. Upon creation of the mapped LUN 262, no storage space is provisioned for the mapped LUN 262 and data referred to by the mapped LUN 262 is indicated as unallocated data. In such an example, the mapped LUN-2 262 remains inaccessible to a host until mappings of the mapped LUN-2 262 are updated.

Figure 6C:
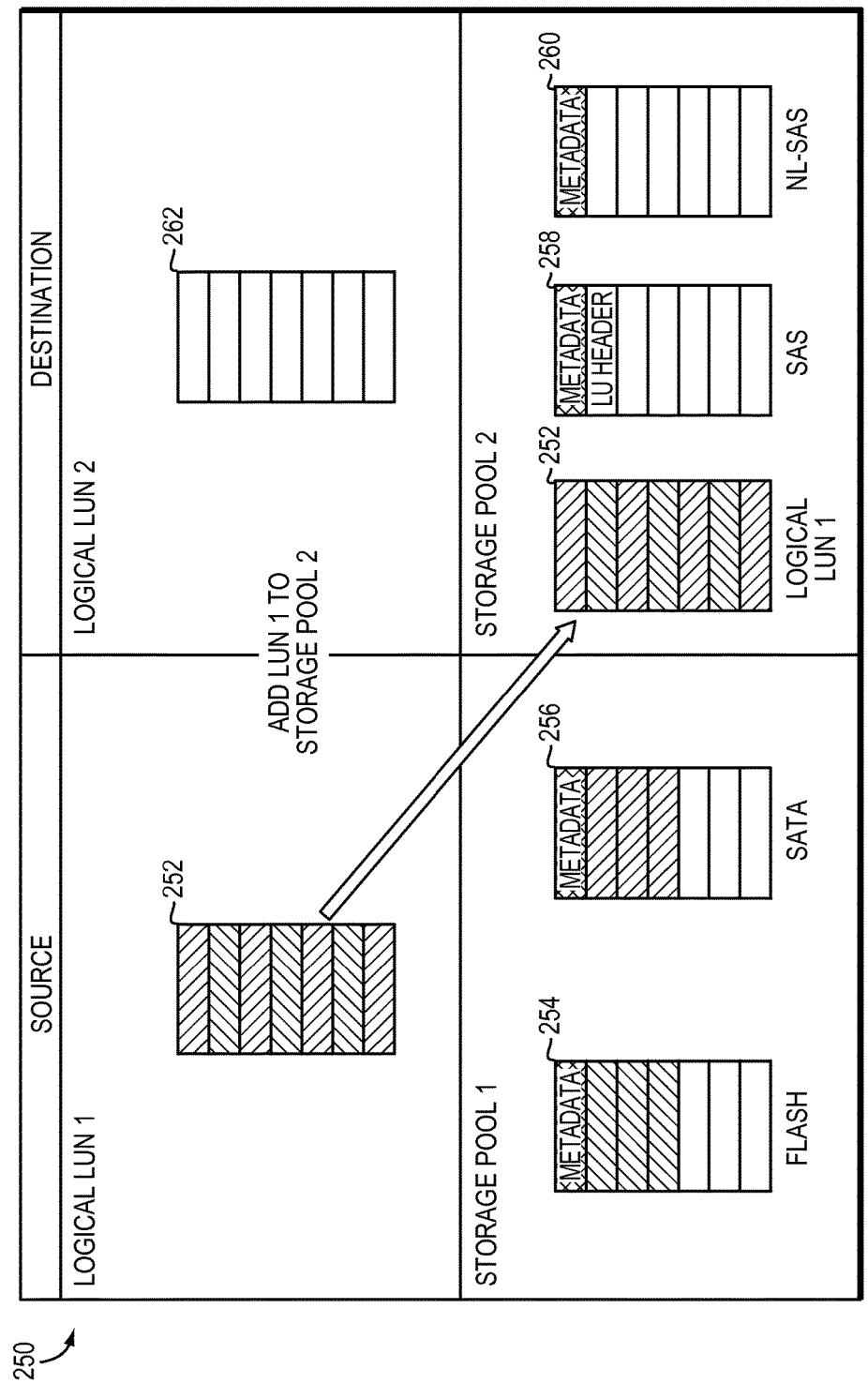

FIG. 6C illustrates start of an example data migration process in accordance with the current technique. In at least one embodiment of the current technique, the source logical LUN 252 is added to the destination storage pool such that the source logical LUN 252 is included as a storage device accessible from the destination storage pool. Addition of the source logical LUN 252 (e.g., a mapped LUN) to the destination storage pool is similar to adding and/or expanding of the destination storage pool by adding a LUN similar to a LUN represented by storage devices (e.g., SAS, NL-SAS) available in the destination storage pool. Further, the additional storage space added to the destination storage pool by adding the source logical LUN 252 remains inaccessible to a host and is not allocated or provisioned to other logical LUNs created in the destination storage pool. The source logical LUN 252 is used to allocate storage space for destination mapped LUN 262 in fixed sized chunks (e.g. a slice of 1 GB or 256 MB in size).

Figure 6D:
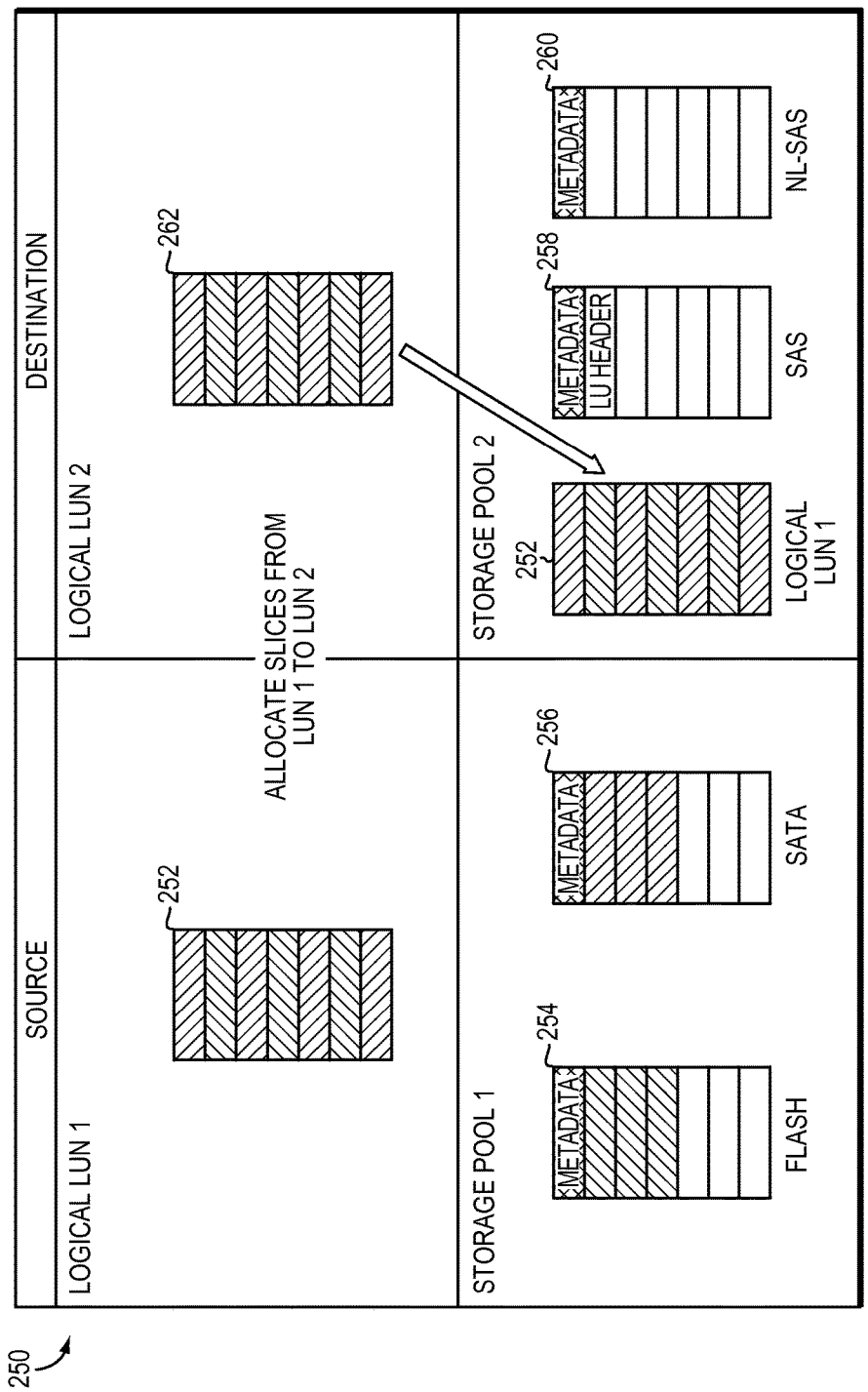

FIG. 6D illustrates an example data migration process in accordance with the current technique. In at least one embodiment of the current technique, the mapped logical LUN 262 may be a thinly provisioned LUN based on virtual mapping provided by file system mapping logic 220 that maps a virtual address of a mapped LUN to physical storage in a storage pool. In the example illustrated in FIG. 6D, storage for destination logical LUN 262 is mapped to the source logical LUN 252 in such a way that for example a block at an offset 0 of the destination logical LUN 262 is mapped to a block at offset 0 of the source logical LUN 252 and so on such that each logical offset of the mapped logical LUN 262 is mapped to corresponding offset of the source logical LUN 252. Consequently, for example, if source logical LUN 252 includes a pattern of data "0xFF" at address 0x100, a read request for offset 0x100 for the destination logical LUN 262 retrieve the same pattern of data "0xFF".

Figure 6E:
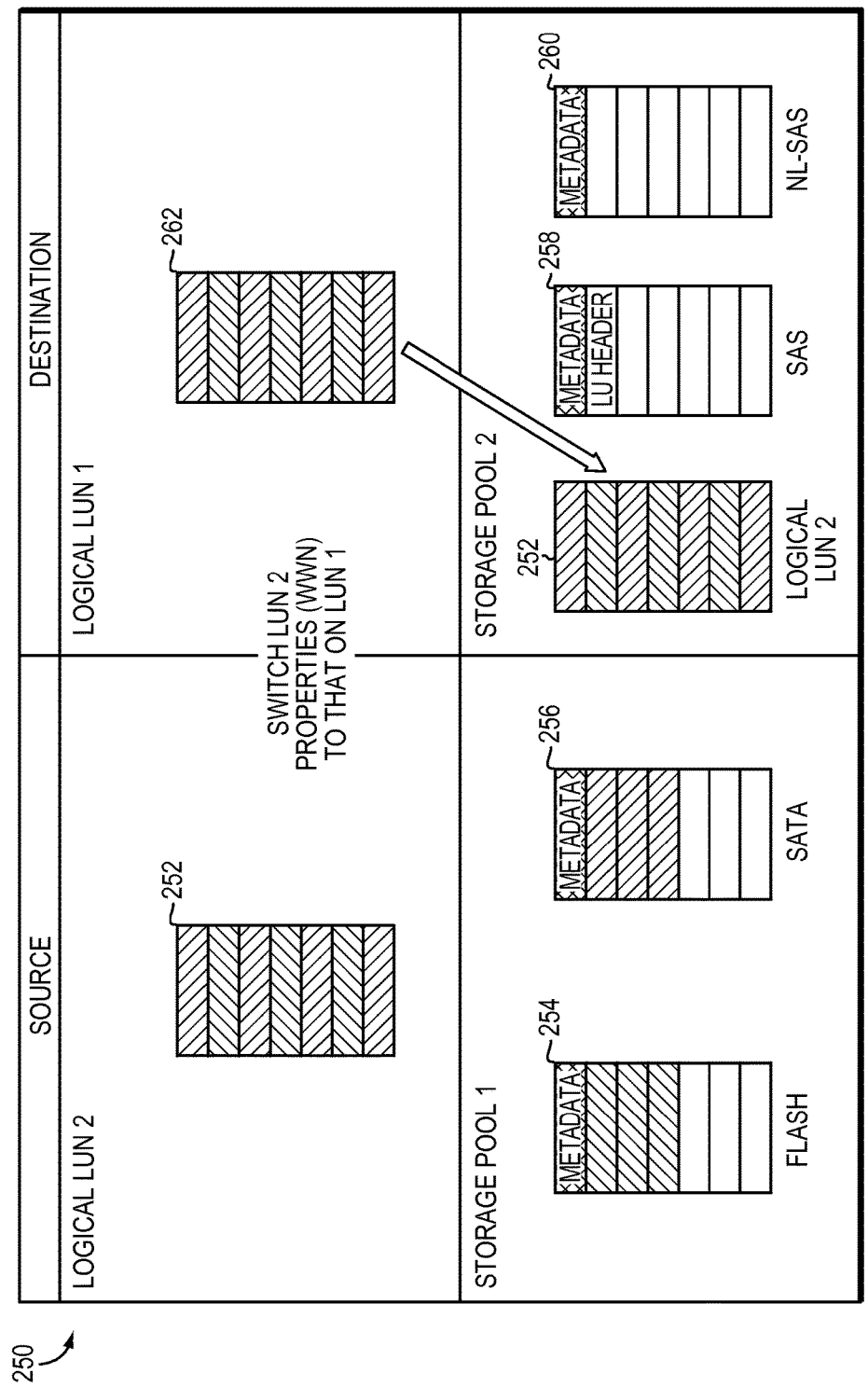

FIG. 6E illustrates an example data migration process in accordance with the current technique. In at least one embodiment of the current technique, when virtual mappings for storage of the destination logical LUN 262 is completely mapped to the source mapped LUN 252, the destination logical LUN 262 is made accessible to a host by switching LUN properties of the destination logical LUN 262 with the source logical LUN 252. The LUN properties of a logical LUN may include the name of the logical LUN and a worldwide number. Further, switching LUN properties of the source and destination logical LUNs 252, 262 does not cause any interruptions to processing by a host where the host may be accessing data of the source logical LUN 252. Thus, in such a case, the host continues to process I/O operations and access data of the source logical LUN 252.

Figure 6F:
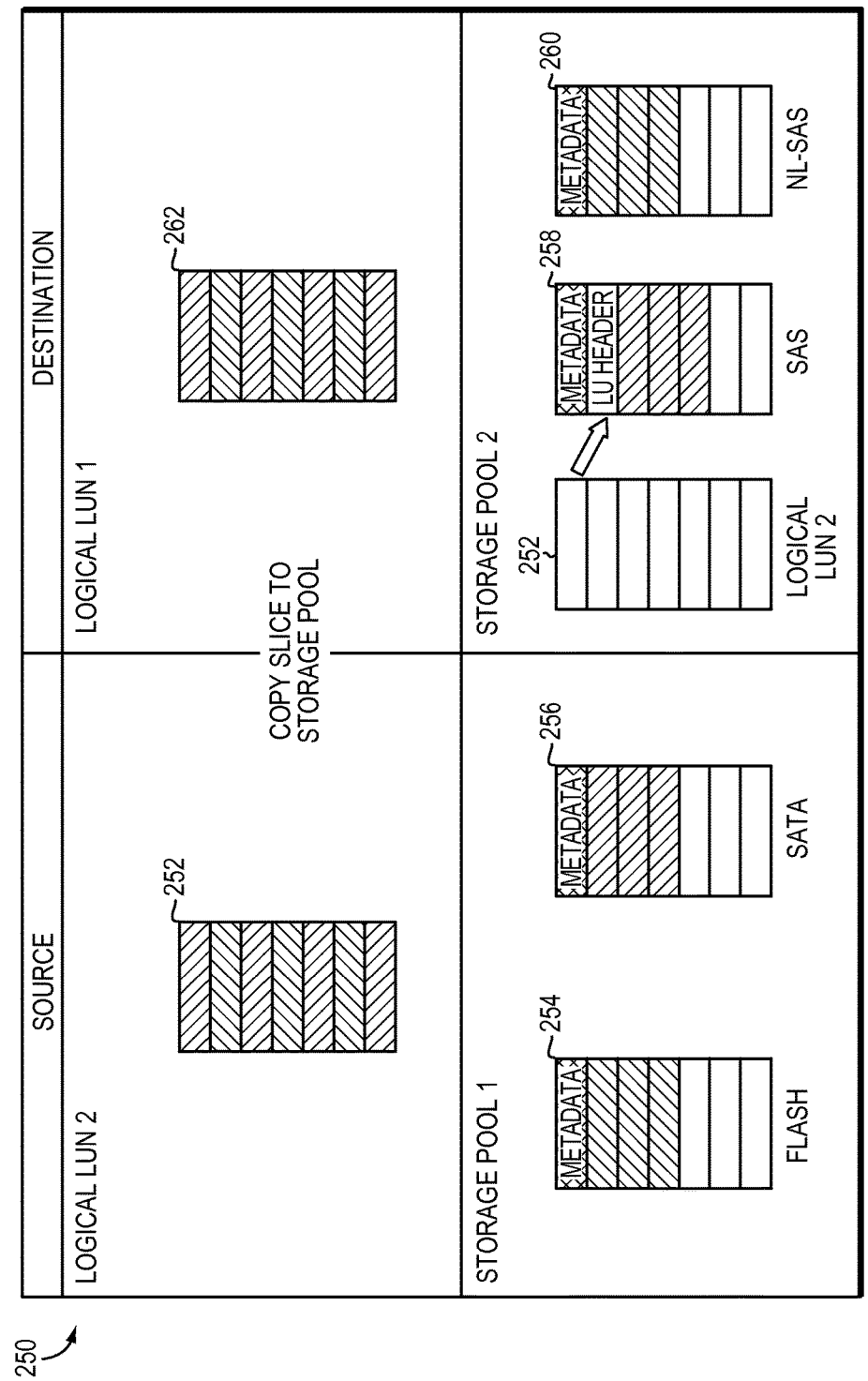

FIG. 6F illustrates an example data migration process in accordance with the current technique. In at least one embodiment of the current technique, after switching LUN properties as illustrated in FIG. 6E, data of the source logical LUN 252 is copied (also referred to herein as "migrated") to storage device included in the destination storage pool in such a way that each slice of the source logical LUN 252 is relocated to a slice allocated from the destination storage pool. Further, virtual address to physical address mappings of the destination logical LUN 262 is updated. Further, data of the source logical LUN 252 is migrated to storage space allocated in the destination storage pool based on availability of storage resources (e.g., CPU capacity) of a data storage system and the rate of data migration expected by a user. Thus, for example, a block at offset 0x0 of the destination logical LUN 262 is mapped to storage space provided by a SAS drive included in the destination storage pool. Further, when entire data of the source logical LUN 252 is migrated to the destination storage pool, each block of the destination logical LUN 262 is mapped to storage space provided by SAS and NL-SAS drives included in the destination storage pool.

Figure 6G:
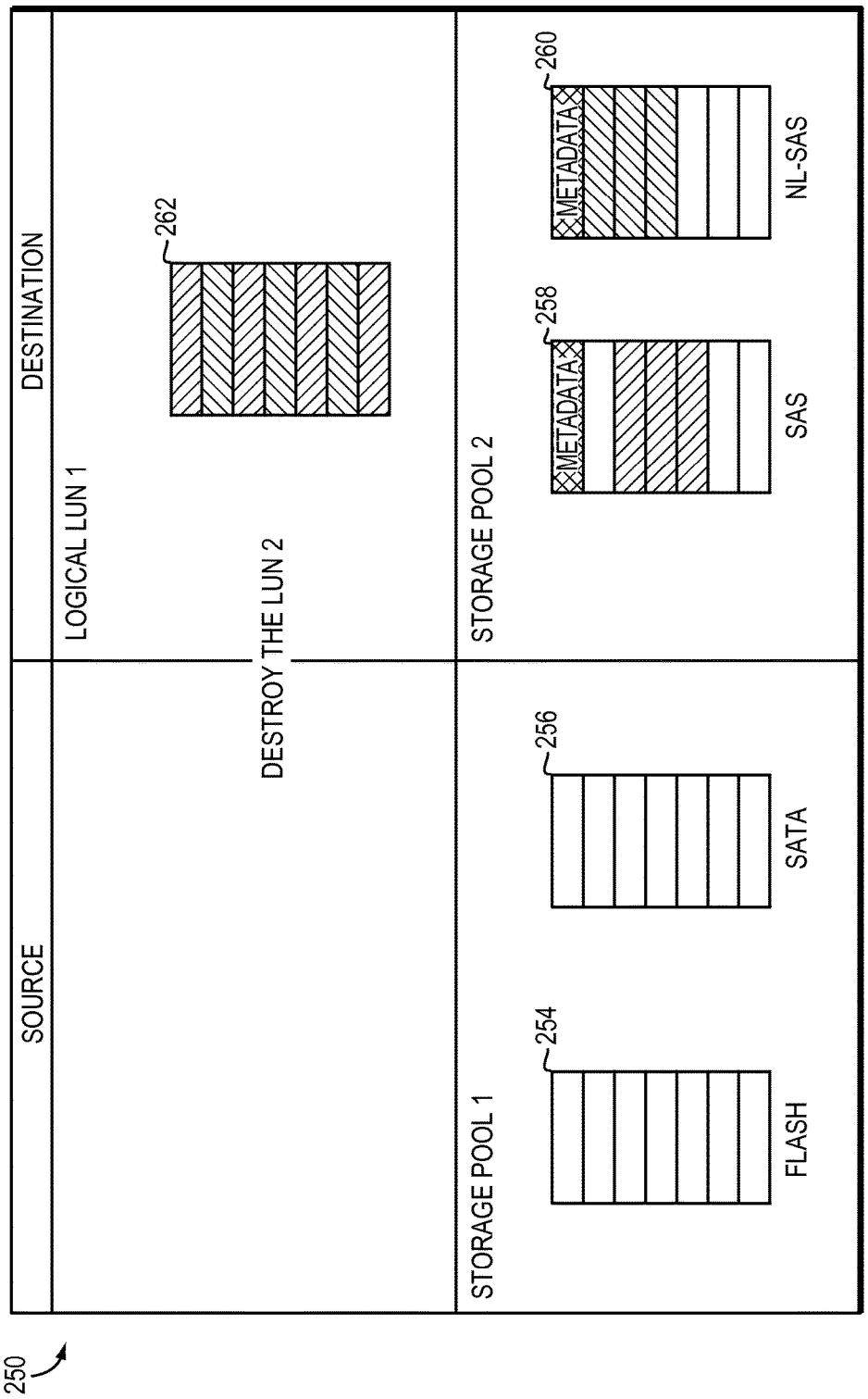

FIG. 6G illustrates an example data migration process in accordance with the current technique. In at least one embodiment of the current technique, when entire data of the source logical LUN 252 is migrated to the destination storage pool, the source logical LUN 252 is deleted and removed from the source and/or destination storage pools.

Figure 7:
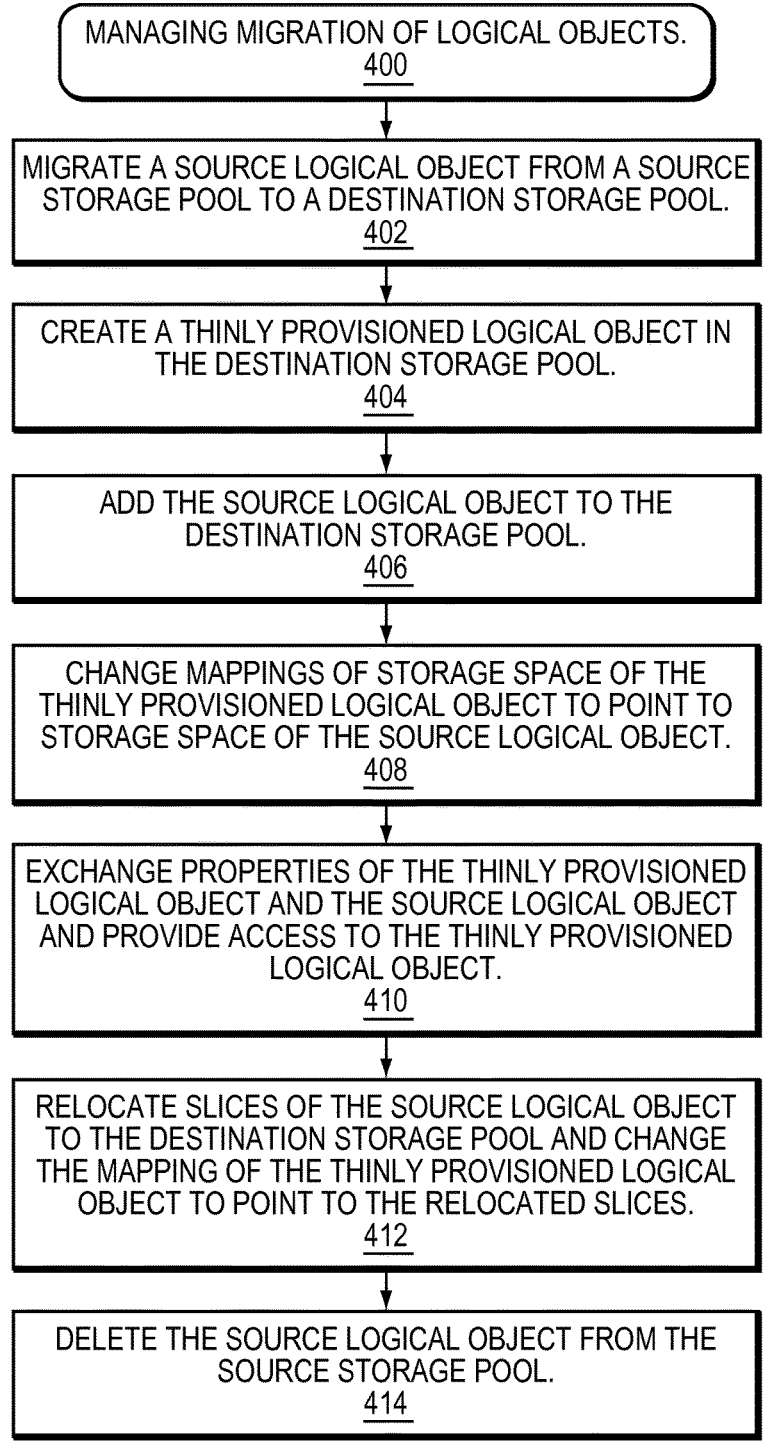
FIG. 7 is a flow diagram illustrating processes that may be used in connection with techniques herein.

Referring to FIG. 7, shown is a more detailed flow diagram illustrating managing data migration in storage systems (step 400). With reference also to FIGS. 1-6, in at least one embodiment of the current technique, a data storage system may receive a request to migrate data of a source logical object such as a mapped LUN from a source storage pool to a destination storage pool (step 402). Upon receiving the request to migrate data of the source logical LUN, a new destination mapped LUN is created in a destination storage pool (step 404). The source logical LUN is then added to the destination storage pool such that the source logical LUN becomes accessible from the destination storage pool (step 406). Mappings of storage space of the newly created destination mapped LUN is changed to refer to storage space of the source logical LUN (step 408). LUN properties (e.g., worldwide number (WWN) of a LUN, the name of the LUN) of the newly created destination mapped LUN are exchanged with the source logical LUN such that a host I/O directed to the source logical LUN is sent to the new destination mapped LUN (step 410). Each slice of the source logical LUN is copied to the destination storage pool until entire data of the source logical LUN is migrated (step 412). The source logical LUN is then deleted from the source storage pool when the data of the source logical LUN is migrated completely to the destination mapped LUN of the destination storage pool (step 414).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data migration in storage systems, the method comprising:
receiving a request to migrate data of a logical object from a source storage pool to a destination storage pool;
creating a new mapped logical object in the destination storage pool, wherein storage space is not provisioned for the new mapped logical object at the time the new mapped logical object is created;
mapping the data of the logical object to address space of the new mapped logical object created in the destination storage pool;
prior to relocating the data of the logical object to storage space allocated in the destination storage pool, updating metadata of the new mapped logical object with metadata of the logical object, wherein the metadata of the logical object includes identification information of the logical object, wherein updating metadata of the new mapped logical object enables access to the new mapped logical object as the logical object by assuming identity of the logical object, and wherein both the logical object and the new mapped logical object are made accessible to at least one of a host and user after the mapping the data of the logical object to the address space of the new mapped logical object;
relocating the data of the logical object to storage space allocated in the destination storage pool in background, wherein mappings of the mapped logical object is updated to refer to the data relocated to the storage space allocated in the destination storage pool; and
deleting the logical object from the source storage pool upon relocation of the data of the logical object.

2. The method of claim 1, wherein the logical object includes a logical volume, wherein a logical volume comprises a set of slices, each slice of the set of slices is a logical representation of a subset of physical disk storage.

3. The method of claim 1, wherein a storage pool includes a disk drive system comprising a plurality of Redundant Array of Inexpensive Disks (RAID) systems, each RAID system of the plurality of RAID systems having a first disk drive and a second disk drive.

4. The method of claim 1, wherein the new mapped logical object is a thin provisioned logical volume.

5. The method of claim 1, wherein mapping the data of the logical object to the new mapped, logical object further comprising:
updating mapping information of the new mapped logical object, wherein the mapping information of the new mapped logical object points to the data of the logical object.

6. The method of claim 1, further comprising:
exchanging metadata information of the logical object with metadata information of the new mapped logical object, wherein upon exchanging the metadata information, the new mapped logical object assumes identity of the logical object; and
providing access to the data of the logical object by using mapping information of the new mapped logical object.

7. The method of claim 1, wherein relocating the data of the logical object includes allocating slices in the destination storage pool and migrating the data to the slices allocated in the destination storage pool.

8. The method of claim 1, wherein an auto-tiering policy engine identifies a set of slices for migration, wherein the slice is a logical representation of a subset of physical disk storage.

9. A system for use in managing data migration in storage systems, the system comprising a processor configured to:
receive a request to migrate data of a logical object from a source storage pool to a destination storage pool;
create a new mapped logical object in the destination storage pool, wherein storage space is not provisioned for the new mapped logical object at the time the new mapped logical object is created map the data of the logical object to address space of the new mapped logical object created in the destination storage pool;
prior to relocating the data of the logical object to storage space allocated in the destination storage pool, update metadata of the new mapped logical object with meta data of the logical object, wherein the metadata of the logical object includes identification information of the logical object, wherein updating metadata of the new mapped logical object enables access to the new mapped logical object as the logical object by assuming identity of the logical object, and wherein both the logical object and the new mapped logical object are made accessible to at least one of a host and user after the mapping the data of the logical object to the address space of the new mapped logical object;
relocate the data of the logical object to storage space allocated in the destination storage pool in background, wherein mappings of the mapped logical object is updated to refer to the data relocated to the storage space allocated in the destination storage pool; and
delete the logical object from the source storage pool upon relocation of the data of the logical object.

10. The system of claim 9, wherein the logical object includes a logical volume, wherein a logical volume comprises a set of slices, each slice of the set of slices is a logical representation of a subset of physical disk storage.

11. The system of claim 9, wherein a storage pool includes a disk drive system comprising a plurality of Redundant Array of Inexpensive Disks (RAID) systems, each RAID system of the plurality of RAID systems having a first disk drive and a second disk, drive.

12. The system of claim 9, wherein the new mapped logical object is a thin provisioned logical volume.

13. The system of claim 9, wherein mapping the data of the logical object to the new mapped logical object further comprising:
updating mapping information of the new mapped logical object, wherein the mapping information of the new mapped logical object points to the data of the logical object.

14. The system of claim 9, further comprising:
exchange metadata information of the logical object with metadata information of the new mapped logical object, wherein upon exchanging the metadata information, the new mapped logical object assumes identity of the logical object; and
provide access to the data of the logical object by using mapping, information of the new mapped logical object.

15. The system of claim 9, wherein relocating the data of the logical object includes allocating slices in the destination storage pool and migrating the data to the slices allocated in the destination storage pool.

16. The system of claim 9, wherein an auto-tiering policy engine identifies a set of slices for migration, wherein the slice is a logical representation of a subset of physical disk storage.

* * * * *